Oct. 13, 1959 D. H. FAIREST ET AL 2,908,414
LABELLING MACHINES
Filed Feb. 5, 1958 10 Sheets-Sheet 4

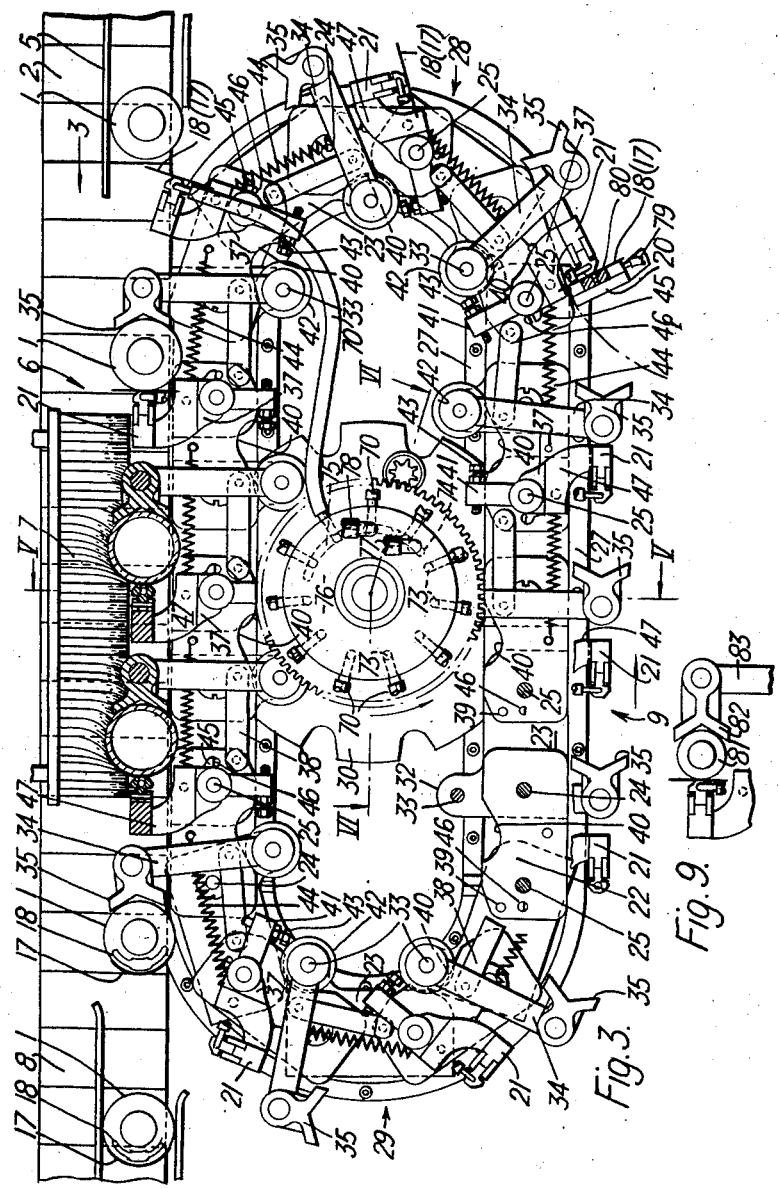

Inventor
Derek H. Fairest
& Sydney E. Banks
By
Watson, Cole, Grindle & Watson
Attorney Oct. 13, 1959 D. H. FAIREST ET AL 2,908,414
LABELLING MACHINES
Filed Feb. 5, 1958 10 Sheets-Sheet 5

Inventor
Derek H. Fairest &
Sydney E. Baxter
By
Watson, Cole, Grindle & Watson
Attorney

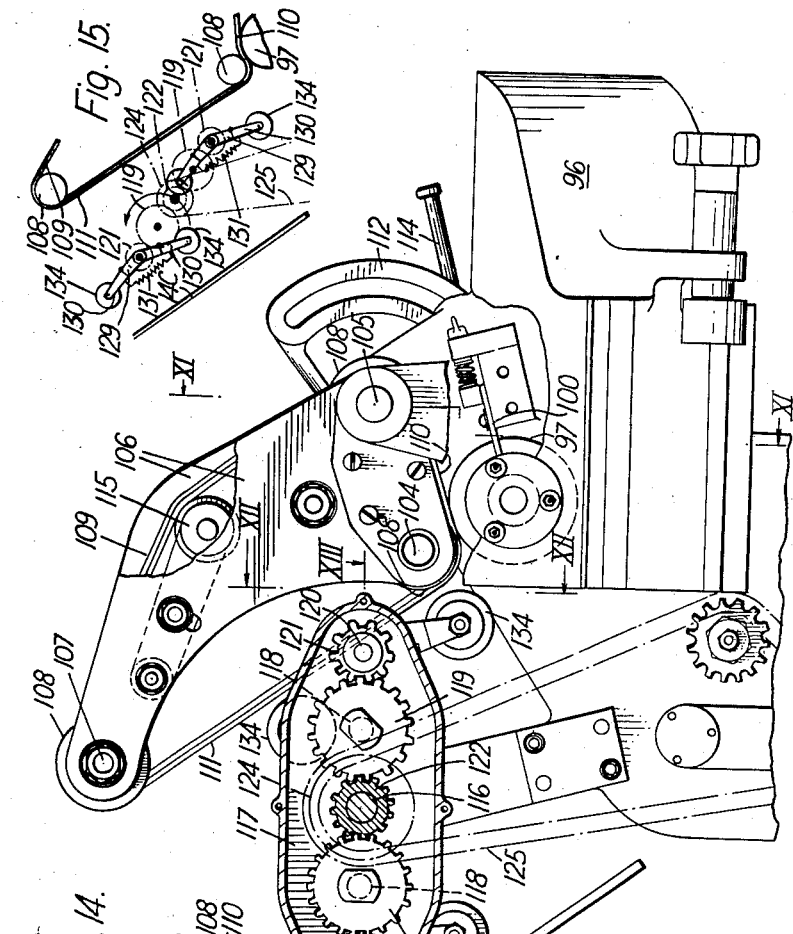

Oct. 13, 1959 D. H. FAIREST ET AL 2,908,414
LABELLING MACHINES
Filed Feb. 5, 1958 10 Sheets-Sheet 7
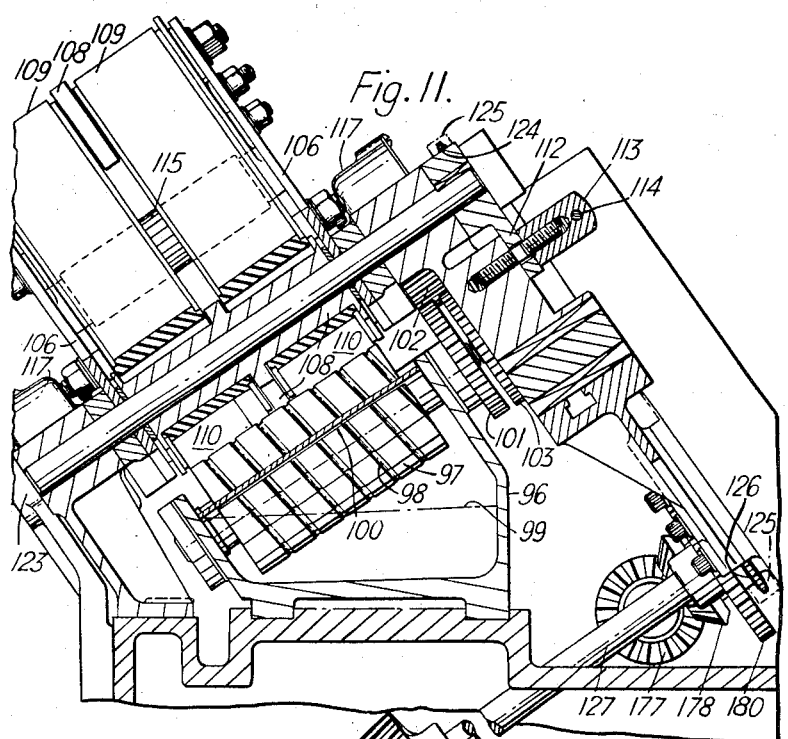
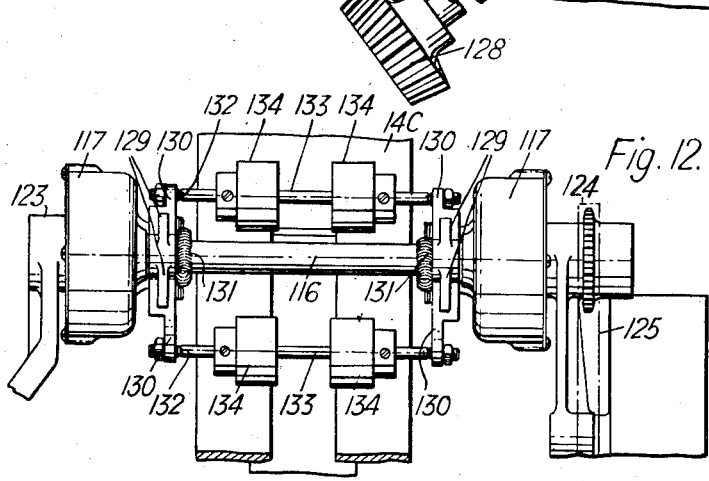
Inventor
Derek H. Fairest
& Sydney E. Banks
By
Watson, Cole, Grindle & Watson
Attorney

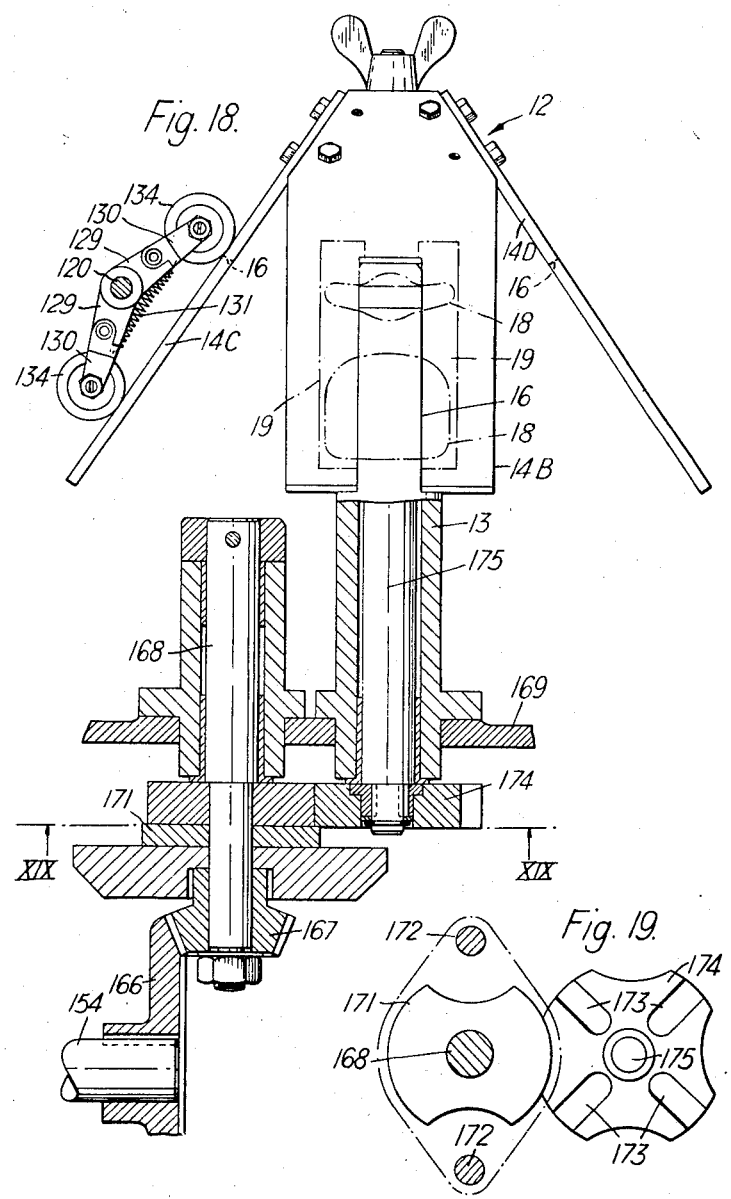

Oct. 13, 1959     D. H. FAIREST ET AL     2,908,414
LABELLING MACHINES
Filed Feb. 5, 1958     10 Sheets-Sheet 10
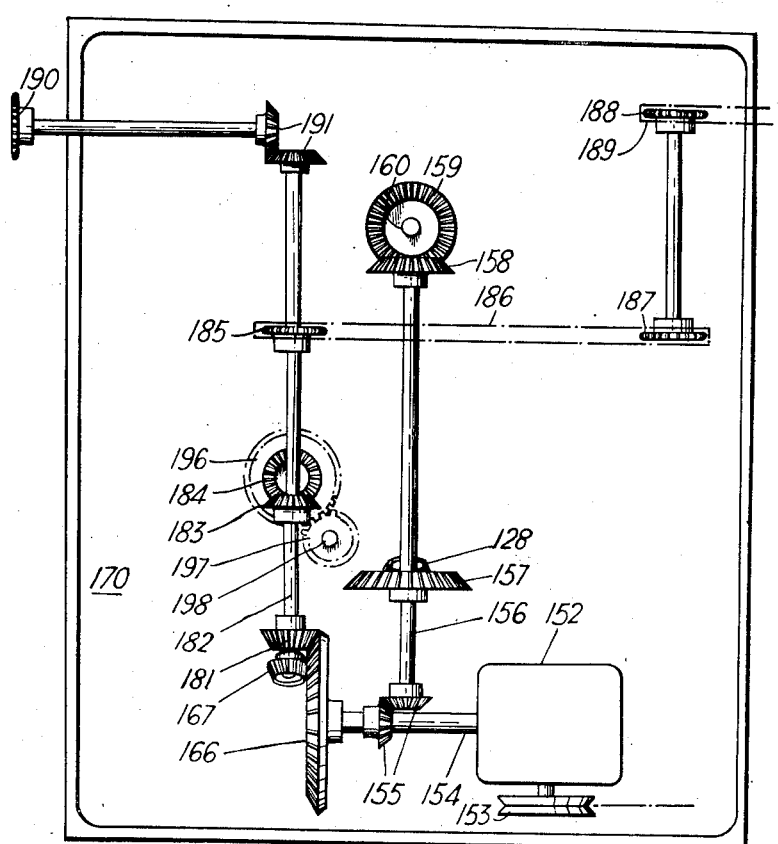
Fig. 20.
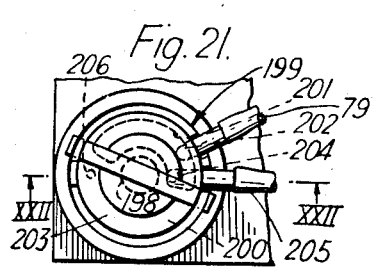
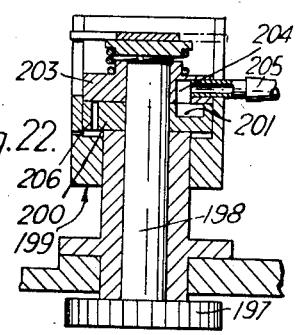

United States Patent Office

2,908,414
Patented Oct. 13, 1959

2,908,414

LABELLING MACHINES

Derek H. Fairest and Sydney E. Banks, Sheffield, England, assignors to Morgan Fairest Limited, Sheffield, England Application February 5, 1958, Serial No. 713,420

Claims priority, application Great Britain February 15, 1957

10 Claims. (Cl. 216—54)

This invention relates to labelling machines of the type having an intermittently rotatable pick-up box with apertured sides, a gumming device to apply gum to an apertured side in one position of rest of the box, a label stack movable to apply a label to a gummed apertured side in another position of rest, a suction transfer pusher movable from inside the box through the aperture of a side in yet another position of rest to detach a gummed label from the side, suction labelling bars continuously movable in an orbital path for each to receive on its rearward face a gummed label from the pusher and to hold the label by its non-gummed side, and propelling means to push an upright article along part of the orbital path behind each bar for the article to make contact with the label, the gummed face of which is then caused to adhere to the article.

In known machines, the labelling bars and associated propelling means have been movable in a circular orbit and the articles had to be diverted into and out of part of that orbit to receive their labels from the bars, and to receive any wiping action necessary for the labels to be pressed to the sides of the articles. This diversion interfered with the free flow of articles through the machine, and also necessitated a relatively low rate of operation, e.g., to avoid complication because of the effect of centrifugal force on the articles as they moved round part of the orbit.

The object of the invention is to provide a machine of the type indicated, but with the articles pursuing a straight-line flow into, along, and out of a section of the machine in which the labels are applied to the articles.

According to the present invention, a labelling machine for upright articles comprises a straight conveyor for supporting the articles, feed means to deliver the articles in spaced sequence along the conveyor, an endless carrier with a labelling run parallel to the conveyor, labelling bars mounted in projecting position from the carrier so as to be brought over the conveyor in the labelling run, with suction openings facing rearwardly, corresponding propelling means movable in the direction of movement of the bars along that run but in spaced rearward relation to the corresponding bars, to press each successive article towards a bar, an intermittently rotatable pick-up box with apertured sides mounted alongside the return run of the carrier, means to apply gum to the sides of the box, a label stack movable towards a side of the box when the box is at rest, and a suction transfer pusher then movable through the aperture of another side of the box to detach a label previously removed from the stack by gum on that side, the pusher being movable to overtake an upright labelling bar in the return run to transfer a label to that bar for eventual application of the label by the bar to an article in the labelling run, and the pusher then returning into the pick-up box.

The propelling means are preferably mounted on the same endless carrier as the labelling bars. Thus, the carrier may be a chain of links pivoted together about vertical axes, with labelling bars carried by alternate links and propelling means carried on vertical axes on the other links, together with a connecting rod between each propelling means and the next preceding link to retard and then accelerate the propelling means with respect to the preceding labelling bar as the links move into the labelling path. The labelling bars may also have vertical pivots, and may be urged by a spring towards a following propelling means, and moved in the opposite direction by contact with a preceding propelling means as each bar enters and leaves the labelling run, to facilitate passage of the articles into and out of that run.

The pick-up box is preferably mounted on an inclined axis, with its sides inclined to that axis, so that each side in turn is brought into a vertical plane parallel to the return run of the carrier, and each side in turn is brought into a substantially horizontal position. This permits the label stack to be mounted above that position and supply labels by a downward movement, the stack being at a convenient height and position for attention by the operator.

The length of each side of the pick-up box may be sufficient to receive more than one label, a corresponding number of stacks being movable together towards the pick-up box, and the suction transfer pusher can then transfer the labels together to each labelling bar.

The transfer pusher is advantageously disposed to swing towards a labelling bar that is leaving the return run of the carrier, and thus more widely spaced from the succeeding propelling means. This allows the pusher to swing rapidly from inside the pick-up box to the bar and back again while the pick-up box is at rest, to allow the box to move intermittently while the pusher is inside the box.

When more than one label is transferred to each labelling bar by the transfer pusher, one of these may be a body label for a bottle, and the other a neck label, and the bar may then have two pads, movable relatively to each other on the bar but interconnected so that as the pad for the body label meets the body of the bottle, the pad for the neck label is moved to meet the neck. The neck label may also be pivoted, so that it automatically conforms to the inclination of the neck.

Of particular advantage for applying gum to the pick-up box over a length sufficient for both a body label and a neck label, gumming mechanism for the machine according to the invention comprises an endless band mounted with a run parallel to the stationary side of the pick-up box to be gummed, a gum trough, a roller to apply gum from the trough to the band, two pairs of gum transfer rollers all with parallel axes transverse to the band and the box side, supports at the ends of the pairs of rollers rotatable about a parallel transverse axis between the band and the side, a stationary gear co-axial with each support, intermediate gears on each side of that gear, and gears of the same size as the stationary gear meshing with the intermediate gears and secured to parallel spindles rotatable in the supports, and two arms on each spindle for the ends of each pair of gum transfer rollers, these arms keeping each pair of rollers parallel to the endless band and the box side and transferring the rollers from the band to the side and then from the side to the band in the rotation of the supports that carry the rollers first along the band and then along the side. The arms for the ends of each pair of rollers may be spring-urged towards the box-side, so as to yield when they are brought into contact with that side by the rotation of the supports.

The invention will now be described in detail with reference to the accompanying drawings, in which Figure 1 is a diagrammatic plan of the machine as used for applying body labels and neck labels to bottles;

Figure 3 is a plan view of an endless carrier for labelling bars and bottle-propelling means;

Figures 5 and 6 are sections on the lines V—V and VI—VI respectively of Figure 3;

Figure 9 is a fragmentary plan corresponding to part of Figure 3, but showing a modification for a change in bottle size;

Figure 10 is an elevation of the gumming mechanism taken from the upper side of Figure 1, to a larger scale and with some parts broken away;

Figure 2:
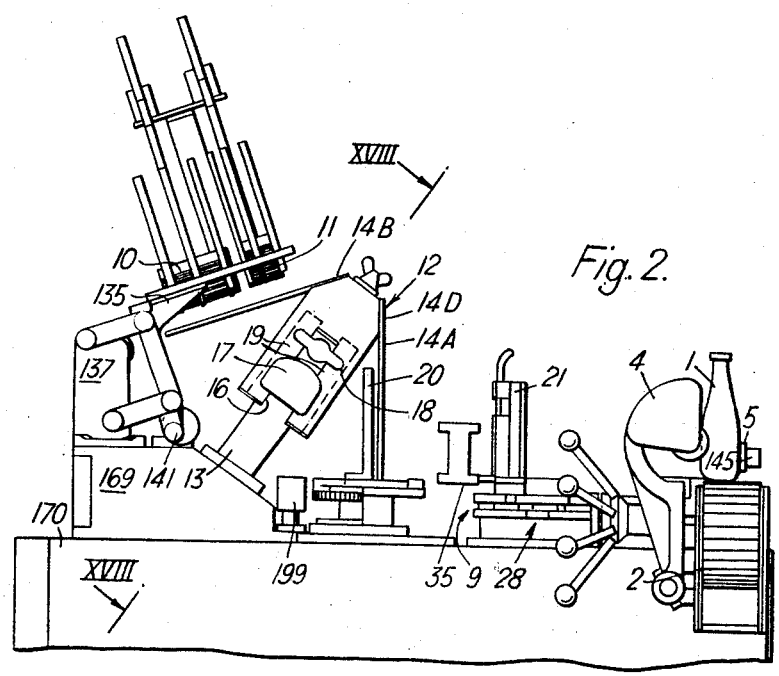
Figure 2 is a diagrammatic end elevation taken from the right-hand side of Figure 1.
Figure 4:
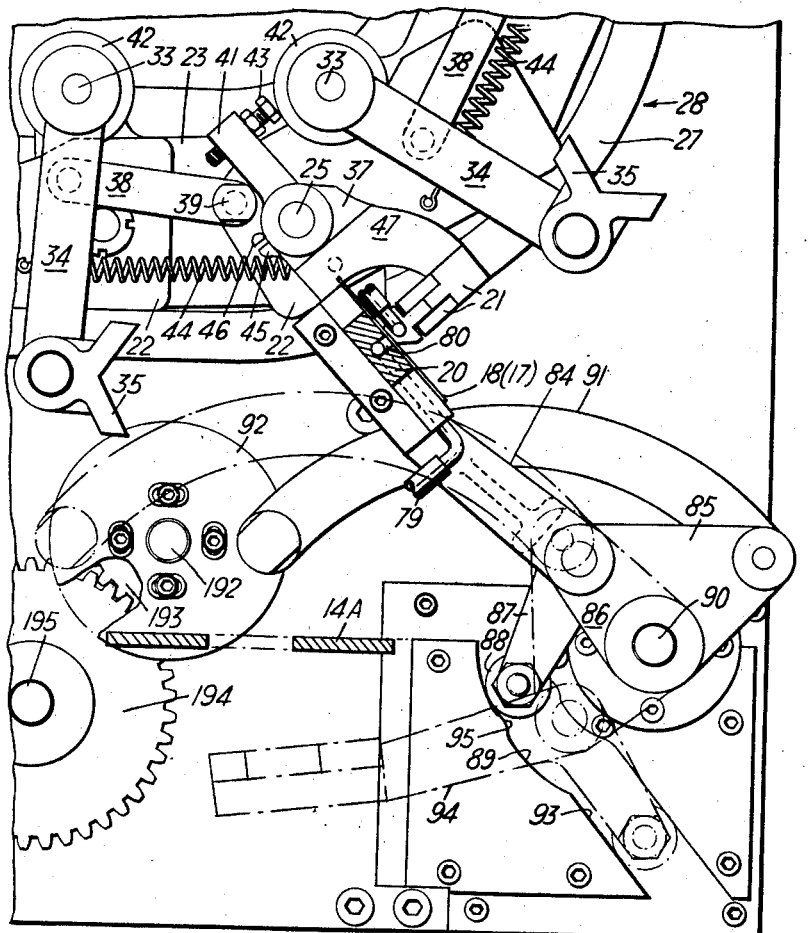
Figure 4 is a plan view of transfer pusher mechanism associated with the endless carrier.
Figure 13:
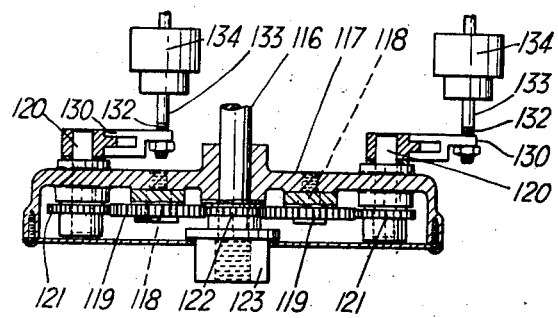
Figure 16:
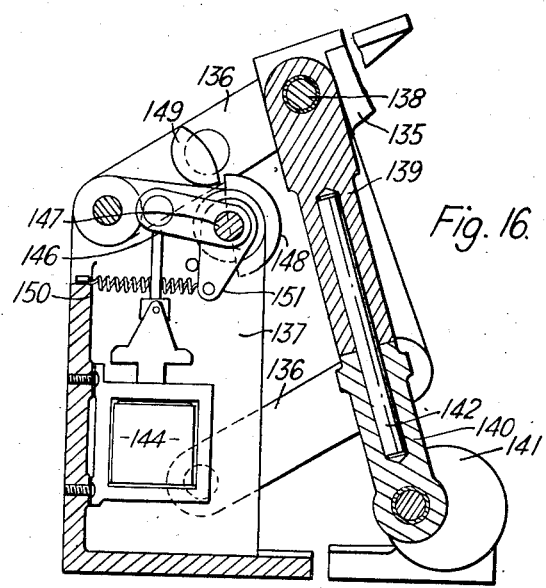
Figure 17:
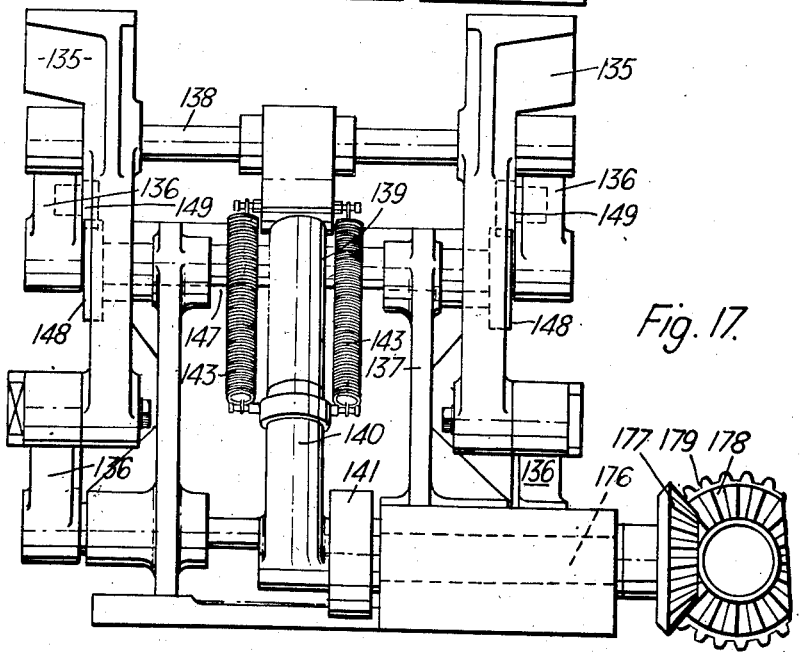

Figures 11, 12, and 13 are respectively a vertical section on the line XI—XI, a view from the line XII—XII and a vertical section on the line XIII—XIII of Figure 10;

Figures 14 and 15 are diagrammatic views corresponding to part of Figure 10 showing the mechanism in two further operative positions;

Figure 16 is a vertical section of part of Figure 2 to a larger scale;

Figure 17 is an elevation taken from the right-hand side of Figure 16;

Figure 18 is a section on the line XVIII—XVIII of Figure 2 to a larger scale;

Figure 19 is a section on the line XIX—XIX of Figure 18;

Figure 20 is an underneath plan of the geared interconnection of most of the parts of the machine;

Figure 21 is a plan of a rotary valve for supplying suction to the transfer pusher of Figure 4;

Figure 22 is a vertical section on the line XXII—XXII of Figure 21; and

Figure 23:
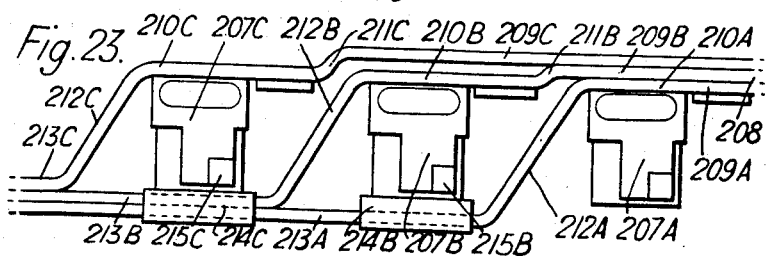

Figure 23 is a diagrammatic plan of three of the machines disposed compactly in series, with conveyors for feeding bottles to the machines and discharging labelled bottles from the machines.

Figure 1:
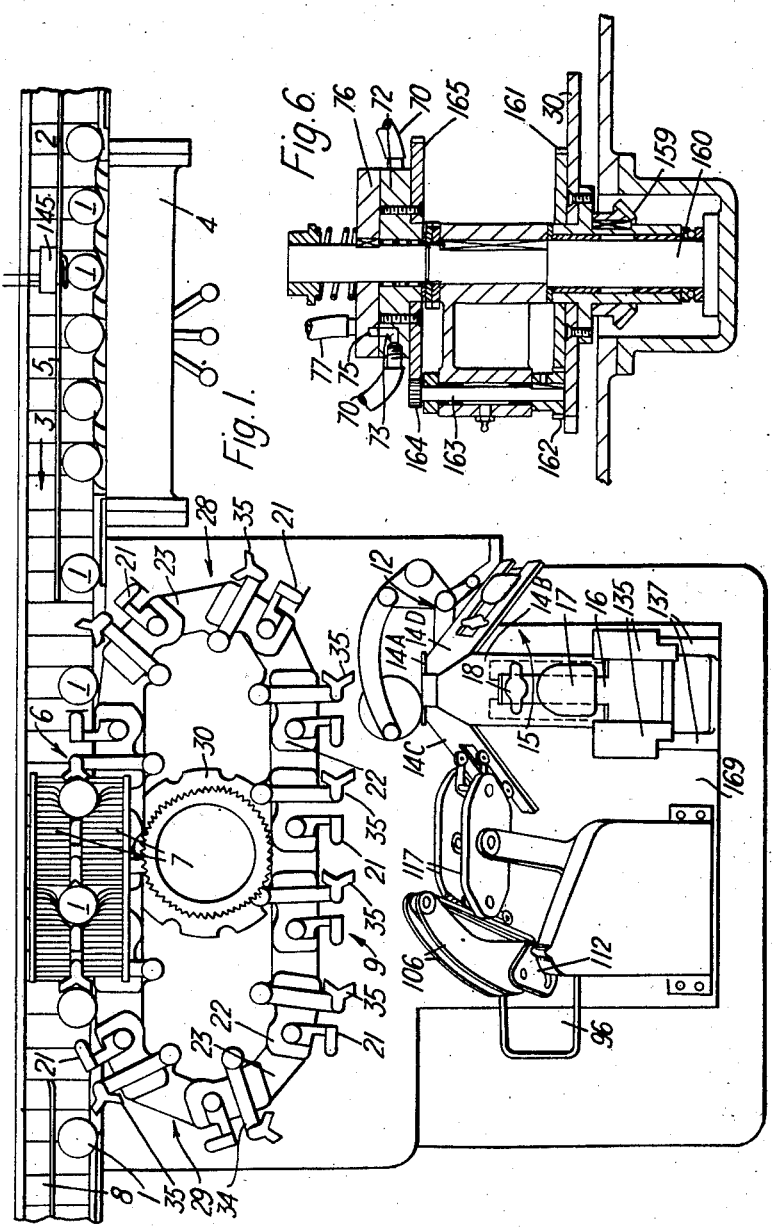

In Figure 1, bottles 1 standing on an endless conveyor 2 moving in the direction of the arrow 3 pass between a worm feed device 4 and an adjustable guide rail 5 and are released by the device 4 in spaced relationship, to be moved by the conveyor into the labelling run 6 of an endless carrier, of which details are shown in Figure 3. Each bottle 1 receives one or more labels brought to it by the carrier at the commencement of the labelling run, and then passes between a pair of brushes 7 that wipe the sides of the label to the curvature of the bottle. The bottles are then released from the endless carrier to continue along the discharge end 8 of the conveyor for removal from the machine.

After releasing the bottles, the endless carrier continues into a return run 9, parallel to the labelling run 1, and towards the end of the return run 9, i.e., just before it turns again towards the feed end of the labelling run 1, the endless carrier receives labels supplied with liquid gum at the sides of one face of each label.

The individual labels are supplied from double stacks 10, 11, one for body labels and the other for neck labels. The two stacks 10, 11 are mounted above a pick-up box 12 intermittently rotatable about an inclined axis provided by a column 13. The stacks 10, 11 are at a convenient height for the operator, and their position above the box 12 minimizes the width occupied by the machine. The pick-up box 12 has four sides 14 forming a truncated pyramid, at an angle to the column 13 such that one side 14A occupies a vertical plane parallel to and spaced from the return run 9 of the endless carrier, while the opposite side 14B occupies a nearly horizontal position below the stacks 10, 11.

The pick-up box 12 rotates in the direction of the arrow 15 in Figure 1 (from which the stacks 10, 11 are omitted, and this brings a side 14C to a skew position, at which it receives gum, as will be described below, and also brings a side 14D to a corresponding skew position, which is an idle position.

The sides 14A . . . D have apertures 16, open at the bottoms of the sides, and these apertures are bridged by a body label 17 and a neck label 18 supplied from the respective stacks 10, 11 and caused to adhere to each side by stripes 19 of gum applied lengthwise of the side, alongside the aperture 16 in that side. When a side bearing the labels reaches the position 14D and is at rest, a suction transfer pusher 20 (of which details are shown in Figure 4) passes from the "inside" of the box 12 through the aperture 16 in that side and swings so as to carry the labels from the plane of the side 14A parallel to the return run 9 of the endless carrier into a position intersecting the path of the carrier as the carrier is beginning to turn towards the feed end of the labelling run 6. The labels 17, 18, with stripes of gum along each side of one face of each, the gum having been taken by the labels from the side of the pick-up box, are carried by the transfer pusher 20 to one of a number of labelling bars 21 on the carrier, taken from the pusher by the bar, and carried by the bar to the labelling run 6.

Figure 5:
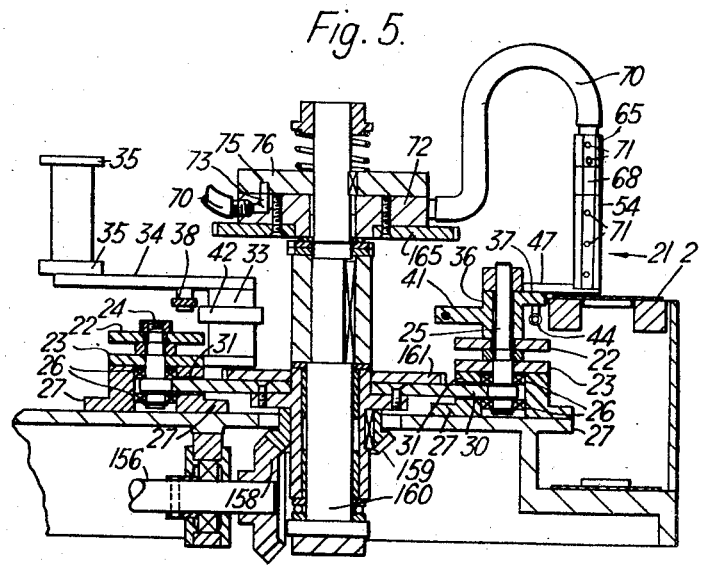

The construction of the endless carrier is shown in Figures 3, 5, and 6. It consists of a chain of upper plate links 22 and lower plate links 23 connected by vertical pivots 24, 25, the lower ends of which carry pairs of ball races 26 guided between inner and outer tracks 27, which define the parallel labelling and return runs 6 and 9, a semi-circular run 28 (Figure 1) joining the run 9 to the run 6, and a semicircular run 29 joining the run 6 to the run 9. A driving sprocket 30 engages the pivots 24, 25 between the ball races 26 at the middle of the runs 6 and 9, the sprocket 30 passing through slots 31 in the inner track 27 (Figure 5).

Each consecutive pair of pivots 25 is spaced in the runs 6 and 9 by the same distance as the centres of consecutive bottles 1 in the run 6, there being one upper link 22 and one lower link 23 for each such spacing. While a link 22 and an adjacent link 23 are in the straight labelling run 6, they serve to propel one bottle 1 and to hold to that bottle the body and neck labels transferred simultaneously to one of the labelling bars 21 by the transfer pusher 20. Each lower link 23 has a lug 32 on its inner side and opposite the pivot 24 for a vertical pivot 33 of a propelling arm 34 that extends outwardly over and beyond the upper link 22 that overlaps the link 23 at the pivot 24. The outer end of the arm 34 extends upwardly and bears upper and lower V-jaws 35 symmetrically above the centre line of the path of the bottles 1 along the labelling run 6.

The pivot 25 extends upwardly and carries the boss 36 of a short arm 37 to which is secured one of the labelling bars 21, which upstands from the arm 37 in line with the centre of the V-jaws 35 of the subsequent propelling arm 34.

Each propelling arm 34 is connected by a rod 38 to the rear inner corner 39 of the preceding upper link 22, with the result that, when the links 22 and 23 are moving round the semi-circular runs 28, 29, the arm 34 is rocked backwardly about its pivot 33 from its normal position at right angles to its link 23, and the V-jaws 35 are moved away from the labelling bar 21 in advance of them. This movement is used for three different purposes:

First, as the links 22 and 23 move from the semi-circular run 28 into the labelling run 6 (Figure 1), the jaws 35 on each propelling arm 34 are delayed relative to the link 23 on which the arm is carried, so that as a bottle 1 on the conveyor 2 moves close behind a labelling bar 21 that has just moved over the conveyor, the following arm remains rocked backwardly until its jaws 35 move over the conveyor, until the movement of the link 23 out of the curved path 28 brings the arm 34 quickly back to right-angles to the link 23. This ensures that the jaws 35 move in the line of the labelling run 6 when they make contact with the rear of the bottle, and that the bottle is pressed along that line to the labelling bar 21.

Second, when the bottles 1 reach the other end of the labelling run 6 and the link 22 begins to move into the semi-circular run 29, the propelling arm 34 is delayed relative to its link 23, while the labelling bar 21 is accelerated (as explained below), thus permitting the labelled bottle to pass freely from the jaws 35 into the discharge run 8 of the conveyor 2.

Third, when the links 22 and 23 are approaching the semi-circular run 28 at the end of the return run 9, the propelling arm 34 is again delayed relative to its link 23, while the labelling bar 21 is once again accelerated, to produce a larger gap (Figure 4) into which the transfer pusher 20 can swing freely to the bar 21 and back again.

Each link 22 has a notch 40 in its inside edge into which enters the pivot end 33 of the preceding propelling arm 34 as the links 22, 23 move from the straight path 6 (or 9) into the curved path 29 (or 28), as shown in Figure 3. At this time, the pivot end 33 approaches an arm 41 that pivots with the arm 37 carrying the following labelling bar, and rocks the combined arm 41, 37 by contact of a roller 42 on the pivot 33 with an adjustable stop 43 on the arm 41. Therefore, when (as at the bottom right-hand corner of Figure 3), the transfer pusher 20 has cleared one retarded propelling arm 34 in its swinging approach to the preceding labelling bar 21, that bar 21 has been swung forwardly against the action of a spring 44 connecting the arm 37 to the following link 22. This brings the labelling bar 21 into correct position to be encountered by the pusher 20. It will be seen that a stop 45 on the arm 37 has moved away from a stop 46 on the link 22 carrying the pivot 25 of the arm 37.

When any arm 37 has nearly reached the conveyor 2 (at the top right-hand corner of Figure 3), the roller 42 on the preceding pivot 33 has left the stop 43 and the spring 44 has pulled the stop 45 back to the stop 46. The arm 37 is therefore free to yield, against the action of the spring 44 as a bottle 1 is pressed to the labelling bar on that arm 37 by the jaws 35. Any slight variation in bottle diameter is thus accommodated.

When any arm 37 is leaving the discharge run 8 of the conveyor 2 (the top left-hand corner of Figure 3), the roller 42 on the preceding pivot 33 again engages the stop 43 and rocks the arm 37 forwardly, to bring the labelling bar 21 on that arm quickly clear of the bottle 1 that is moving into that discharge run.

The positioning of the labelling bars 21 and the V-jaws 35 on the arms 35 is thus controlled solely by the construction of the endless carrier formed by the links 22, 23. This eliminates the need for separate cams for the control of these members.

Figure 7:
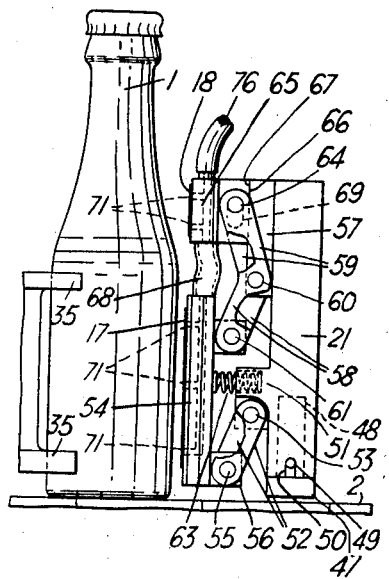
Figures 7 and 8 are side views of a labelling bar with interconnected pads for body labels and neck labels.
Figure 8:
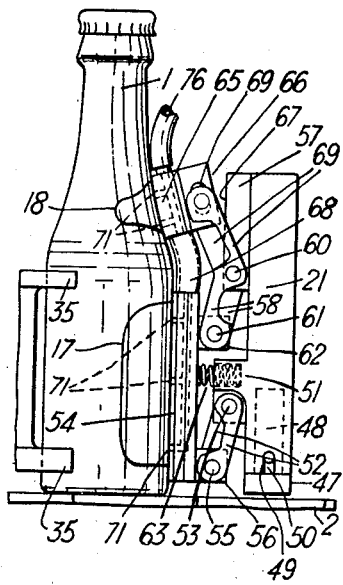

Each labelling bar 21 is carried by an extension 47 of one of the arms 37. The arm 47 carries a spigot 48 (Figure 7) to fit a hole in the bar 21, so that the machine may be fitted with labelling bars appropriate to the particular form of bottle to be labelled and/or the position and/or size of the labels. A pin 49 on the spigot 47 has a slot engagement 50 with the bar 21 to prevent the bar from turning. From a lower forward projection 51 of the bar 21, a pair of links 52 on a horizontal pivot 53 supports the bottom of a body label pad 54, the links being pivoted at 55 on a lower rear projection 56 of the pad. From an upper projection 57, the lower arms 58 of a pair of levers 59 on a pivot 60 lie parallel to the links 52 and are pivoted at 61 to an upper rear projection 62 on the pad 54. Thus, the pad 54 is kept vertical, in whatever position a spring 63 urges it away from the bar 21. The levers 59 are pivoted at 64 to a neck label pad 65. As the spring 63 urges the body label pad 54 away from the bar 21, the rear face 66 of the neck label pad 65 is urged into contact with a vertical face 67 on the projection 57, and the front faces of the pads 54 and 65 are in line with each other. They remain so in line until (see Figure 8) a bottle 1 is pressed to the pads by the propelling jaws 35. They are therefore in line when they are approached (Figure 4) by the transfer pusher 20 carrying a body label 17 and a neck label 18.

When (Figure 8) a bottle 1 is pressed by the jaws 35, the body label pad 54 is first met, and the spring 63 is overcome. The lower ends 58 of the levers 59 move towards the bar 21 and the pivot 64 moves away, to carry the neck label pad 65 towards the neck of the bottle. As the pad 65 meets the neck, it rocks on its pivot 64 so that its face automatically assumes the inclination of the neck, and both pads 54 and 65 make contact with the bottle irrespective of variations in relative diameters at the levels at which the body and neck labels are to be applied.

To enable the pad 65 to pivot, a suction connection 68 between the pads 65 and 54 is flexible, and serves as a spring to control the pad 65 as it rocks about the pivot 64, which moves in a slot 69 in the pad 65.

A flexible connection 70 supplies suction to the pad 65 and the pad 54, which have openings 71 in their faces to be covered by the labels 17, 18 applied to them by the transfer pusher 20. The connections 70 for the pads on all the labelling bars 21 are connected to a rotary valve member 72 (Figures 5 and 6), with equally spaced ports 73 that pass in turn over arcuate ports 74, 75 of a fixed valve member 76, connections 77, 78 supplying high and low suction respectively from any suitable sources of suction. Each connection 70 receives high suction as a labelling bar receives labels from the transfer pusher 20, and as each port 73 leaves the port 74 it is connected momentarily to both ports 74 and 75, and thereafter supplies from the port 75 the lower suction sufficient to hold the labels to the pads on the labelling bar as the labels are carried to the position at which they are applied to the bottle to receive them. High suction from any suitable source is supplied (as described below) by a flexible connection 79 (Figure 2) to the swinging transfer pusher 20, which has openings 80 (Figure 3) at levels to be covered by the body and neck labels.

When, at the top right-hand corner of Figure 3, a bottle 1 has been pressed by the jaws 35 to the preceding labelling bar 21, to bring the body and neck of the bottle into engagement with the body and neck label pads 54, 65 (Figure 8), it is the central portion of each label that encounters the surface of the bottle; the gummed sides of that face of each label extend laterally from the bottle. While the bar 21 continues to hold the labels to the bottle, the progression of the bottle along the labelling path 6 brings these sides between the brushes 7, the bristles of which flex to wipe the sides around the curvature of the body and neck of the bottle, so that when the bottle leaves the brushes the labels remain adhering to the bottle.

As shown by Figure 9, a smaller bottle 81 than shown in Figure 3 may be labelled by the use of jaws 82 that extend farther from their propelling arm 83. Thus, by having interchangeable jaws on the propelling arms 34, the machine will label a wide range of bottle sizes. Although the bottles shown in Figure 1 have a circular section, the machine will label bottles of other sections, the propelling V-jaws 35 being replaced, if necessary, by other jaws appropriately shaped to the shape of the article.

Because the supporting column 13 (Figure 2) for the pick-up box 12 restricts the space within the box into which the transfer pusher 20 can move, and because the transfer pusher must move very quickly out of the box and back again, the mechanism of Figure 4 is used to produce the swinging movement of the pusher. The pusher 20 is carried on an arm 84, in turn carried on a plate lever 85, providing an arm 86 that is substantially in line with the arm 84 while the arm 84 is swinging from just inside the side 14A of the box 12 to the labelling bar 21 and back again. The arms 84 and 86 are kept in line by an arm 87 rigid with the arm 84, which arm 87 carries a follower roller 88 controlled by a cam groove 89 concentric with the pivot 90 of the plate lever 85. The lever 85 is rocked by a connecting rod 91 from a continuously rotating crank disc 92, and thus moves with simple harmonic motion. While the follower roller 88 is in the groove 89, the arms 86, 84 also move with simple harmonic motion, so that the pusher 20 moves from inside the box 12 quickly and smoothly to and from the labelling bar 21, even at high rates of operation, say 150 times a minute or more. However, just as the pusher 20 comes inside the box 12 again, the roller 88 reaches a groove 93 that increases the radial distance of the roller from the pivot 90 of the lever 85, and the arm 84 is brought out of line with the arm 86 and its continued motion is largely parallel to the side 14C until it reaches the position 94 shown in broken lines, during which time the pusher 20 moves only a short distance further into the box 12. While the pusher 20 is inside the box 12 (during approximately one-half of the rotation of the crank disc 92), the box turns to bring the next side 14D (carrying fresh labels) to the position 14A.

In the cam groove 89, there is a slight departure at 95 from the concentric to retard the pusher 20 just before the labelling bar 21 is encountered and this reduces relative motion between the pusher and the bar in the radial direction of the arm 84, 86 carrying the pusher, and ensures clean transfer of the labels.

Especially with tall bottles, more particularly if the neck label occupies a high position, gum must be applied to a considerable length of each side of the pick-up box 12. The gumming mechanism shown in Figures 10 to 13 provides for this, and also provides for applying gum to side 14C, which, as shown in Figure 1, occupies a skew position.

A gum trough 96 has a gum roller 97 on an axis that is transverse to the skew side 14C of the box 12 and parallel to the plane of that side. The roller 97 has a helical groove 98, so that gum picked up by the lower end of the roller below the level 99 is carried up the roller and is spread over its surface by a doctor blade 100. The roller 97 is driven by a gear 101 from a gear 102, in turn driven by a gear 103.

The gear 102 is on a shaft 104 parallel to the roller 97 and to a support shaft 105, about which can be swung side plates 106 carrying the shaft 104 and a parallel shaft 107, the axes of the shafts 104 and 107 being in a plane parallel to the skew side 14C. There are two flanged rollers 108 on each of the shafts 104, 105, and 107, to carry two endless bands 109 forming a run 110 to contact the gum roller 97 and a run 111 parallel to the skew side 14C. One side plate 106 carries an arcuate slotted member 112 (Figures 10 and 11), which can be clamped by a nut 113 (Figure 11) tightened by a bar 114. By slackening the nut 113, the assembly of side plates, shafts, rollers, and endless bands can be swung to inoperative position. A tension roller 115 serves to keep the runs 110, 111 taut.

On a shaft 116 parallel to the shafts 104, 107, and rather nearer the belt run 111 than the skew side 14C, are mounted two rotary gear-boxes 117, each with two parallel stub shafts 118 carrying intermediate gears 119 and two further parallel shafts 120 carrying gears 121 meshing with the gears 119 and of the same diameter as a gear 122 concentric with the shaft 116 but held stationary by connection to one support bearing 123 for the shaft 116. One end of the shaft 116 carries a sprocket 124 driven by a chain 125 from a sprocket 126 on a shaft 127 driven by a bevel gear 128. As the gear-boxes 117 rotate with the shaft 116, and carry the shaft 120 in an orbit round the shaft 116, the connection of the shafts 120 through the gears 121 and 119 to the stationary gears 122 prevents rotation of the shafts 120 about their own axes.

The shafts 120 have secured to them two arms 129 at an angle of about 135° to each other, on which arms are pivoted extension arms 130 urged into line with the arms 129 by springs 131. Because the shafts 120 do not rotate about their own axes, the arms 130 do not rotate about these axes. The arms 130 carry pivots 132 for spindles 133 on which pairs of gum transfer rollers 134 are mounted. In Figure 10, the rollers 134 on one shaft 120 are about to contact the run 111 of the gum bands, and those on the other shaft 120 the skew side 14C. As rotation of the gear-boxes continues, these contacts are made and the arms 130 yield against the action of the spring 131 in the case of the rollers 134 that meet the side 14C, while the resiliency of the run 111 provides yielding contact in the case of the rollers 134 that meet the run.

Consequently, the rollers 134 roll along the run 111 to pick up gum that the endless bands have picked up from the gum roller 97, and then move across the side 14C, where the pair of rollers 134 on the lower spindle 133 transfers gum to a lower reach of the side 14C, while the pair of rollers on the upper spindle 133 transfers gum to an upper reach, which slightly overlaps the lower reach. Consequently, gum can be applied to a length of the side 14C corresponding to the length of the run 111 of the endless bands.

Figure 14 shows the rollers 134 near the top of the run 111 on the one hand and near the bottom of the side 14C on the other. On the side 14C, the upper rollers 134 have just overlapped the reach of the lower rollers 134. The yielding of the arms 130 against the action of the springs 131 will be noted as the rollers 134 have been brought into engagement with the rigid side 14C. Figure 15 shows one set of rollers 134 moving from the run 111 to the side 14C and the other set from that side 14C back to the run 111. The maintenance of the sets of rollers always parallel to the run 111 and the side 14C will be noted from Figure 15.

As shown in Figures 2, 16, and 17, brackets 135 are carried by parallel links 136 from a supporting frame 137, the brackets 135 serving to carry the label stacks 10, 11 with the lowermost labels parallel to the side 14B of the pick-up box 12. The tops of the brackets 135 are connected by a shaft 138, from the centre of which depends a connecting rod 139, with a lower portion 140 driven by a crank disc 141. The parts 139, 140 are aligned by an internal pin 142, and are urged together by external springs 143, which provide that the labels are resiliently pressed to the gummed side 14B when the rod 139 is pulled downwardly. A solenoid 144, connected to a detector 145 (Figure 1) alongside the feed position of the conveyor 2, is normally held energised, to pull down a lever 146 on a shaft 147 carrying semi-circular dogs 148, so that each dog is rotated below a dog 149 projecting from the side of one of the upper links 136. When a bottle 1 passes the detector 145, the deenergising of the solenoid 144 allows the dogs 148 to be drawn clear of the dogs 149 by a spring 150 pulling a lever 151 on the shaft 147, so that the connecting rod 139 can draw the label stacks 10, 11 down to the side 14C of the box 12. However, absence of a bottle leaves the solenoid 144 energised and the dogs 148 prevent downward movement of the links 136, the part 140 moving away from the connecting rod 139, and the springs 143 becoming extended. Consequently, by appropriately positioning the detector 145 along the conveyor 2, absence of a bottle in the feed sequence on the conveyor ensures that labels are correspondingly withheld in the sequence of labels proceeding from the stacks to the labelling run.

Figure 18 shows the pick-up box 12 and the mechanism for driving it intermittently, another view of the latter being shown in Figure 19. Before these are described in detail, reference will be made to Figure 20, which shows the geared interconnection of most of the major elements of the machine. Figure 20 being an underneath plan, its right-hand side corresponds to the left-hand side of Figure 1 and vice-versa.

In Figure 20, a gear-box 152 driven by a pulley 153 by a motor (not shown) drives a shaft 154 with bevel gears 155 to drive a transverse shaft 156. A bevel gear 157 on this shaft drives the bevel gear 128 (see also Figure 11) that drives the gumming mechanism, the shaft 127 carrying the gear 128 being parallel to the gum roller 97. As described below, the stack mechanism (Figures 16 and 17) is driven from the gumming mechanism. Also on the shaft 156 is a bevel gear 158 driving a bevel gear 159 rotatable on a fixed vertical shaft 160 and secured to the sprocket 30 (Figures 5 and 6) for driving the endless carrier (Figure 3). As shown in Figure 6, a gear 161 on the sprocket 30 drives a gear 162 on a shaft 163, and a gear 164 at the top of the shaft (see also Figure 3) drives a gear 165 secured to the rotary valve plate 72.

The shaft 154 carries a bevel gear 166 to drive two bevel gears. The first of these, the gear 167, is on a shaft 168 (Figure 18) parallel to the column 13 of the pickup box 12, and behind the column 13 as viewed in Figure 2. The column 13 is carried by a casing 169 from the main frame 170 of the machine. Within the casing 169 (Figure 18) the shaft 168 carries the pin wheel 171 of the intermittent drive, the wheel 171 having two pins 172 to engage the four radial slots 173 of the driven member 174 of that drive, on the bottom of a shaft 175 through the column 13. The box 12 is interchangeably secured to the top of the shaft 175. The gearing is so chosen that the box 12 makes one-quarter turn for each movement of the transfer pusher 20 (Figures 3 and 4), i.e., at each passage of a labelling bar 21 to the transfer position of Figure 4.

As shown in Figure 2, the frame 137 of the stack mechanism is carried y the casing 169. The crank disc 141 of the stack mechanism is carried on a shaft 176 (Figure 17) with a bevel gear 177 driven by a bevel gear 178 connected to a gear 179. The gear 179 is driven by a gear 180 (Figure 11) on the shaft 127 carrying the sprocket 126 by which the gumming mechanism is driven.

The second bevel gear 181 (Figure 20) driven by the bevel gear 166 drives a second transverse shaft 182 carrying a bevel gear 183 to drive a bevel gear 184 in the drive for the transfer pusher 20, as will be described below.

The shaft 182 also carries a chain sprocket 185 connected by a chain 186 to a sprocket 187 in turn driving a sprocket 188 for a driving chain 189 for the conveyor 2. The shaft 182 also drives a chain sprocket 190 through bevel gears 191, the sprocket 190 serving to drive the worm feed device 4.

The crank disc 92 (Figure 4) for driving the transfer pusher 20 is carried on a vertical shaft 192 carrying a gear 193 meshing with a gear 194 on another vertical shaft 195 on the bottom of which the bevel gear 184 (Figure 20) is carried. Above the bevel gear 194, the shaft 195 carries a gear 196 meshing with a gear 197 carried by the shaft 198 of a rotary valve 199 (Figures 2, 21, and 22), which supplies suction to the openings 80 (Figure 4) while the pusher carries labels from the side 14A of the box 12 to a labelling bar 21. The shaft 198 carries a rotatable valve plate 200 in which is an arcuate groove 201 for connecting a port 202 in a fixed valve plate 203 with a port 204 also in the fixed plate. The port 202 communicates with the openings 80 in the pusher 20 through the flexible connection 79 and the port 204 is supplied with high suction from any suitable source by a flexible connection 205, the length of the arcuate groove 201 being such that the openings 80 are under suction for that time only during which the pusher 20 is carrying labels. Upon pressing of the labels against the labelling bar 21 by the pusher 20, the suction supply to the openings 80 is cut off by passing of the groove 201 out of communication with both of the ports 202, 204 and almost immediately afterwards a hole 206 through the rotary valve plate 200 connects the port 202 (and hence the openings 80) with the atmosphere, to release the residual suction so that the labels are left held to the labelling bar 21 by suction in the openings 71, as described with reference to Figures 7 and 8.

Because the bottles 1 are labelled while they remain on the straight conveyor 2 and move at the speed of that conveyor, the machine is able to operate at a very high rate, e.g., 150 bottles or more per minute. Moreover, since the bottles are merely pushed by the V-jaws 35, which may be shaped to suit the shape, circular or otherwise, of a variety of bottles, it is adaptable to the needs of the users of different kinds of bottles. Even though the dimensions of the pick-up box 12, and associated stack mechanism and gumming device are such that more than one label can be applied to each bottle, the machine is compact in width. This makes it possible for two or more machines to be used in series as shown in Figure 23, with each machine accessible to the operator, to label a very large number of bottles in one general feed line.

The bottles are supplied to the assembly of machines 207A, B, C by a wide conveyor 208, or by more than one conveyor side-by-side, and directed into parallel tracks 209A, B, C, the track 209A feeding directly the labelling run 210A of the machine 207A, and the tracks 209B, C being diverted at 211B, C to feed the labelling runs 210B, C of the machines 207B, C. The labelled bottles from the machine 207A are discharged to an oblique conveyor 212A, which leads to a conveyor 213A that passes through a tunnel 214B in front of the machine 207B. Similarly, the machine 207B discharges bottles to an oblique conveyor 212B, which leads to a conveyor 213B, and both the conveyors 213A, B pass through a tunnel 214C in front of the machine 207C. The machine 207C discharges bottles to an oblique conveyor 212C leading to a conveyor 213C alongside the conveyor 213B. The operator can reach over the tunnels 214B, C to attend to the machines 207B, C, particularly to replenish the label stacks 215B, C, without interfering with labelled bottles from the previous machines. Moreover, any one of the machines may be stopped, without interfering with the operation of the others.

What we claim is:

1. A labelling machine for upright articles, comprising a straight feed and delivery conveyor for a succession of articles, an endless chain with a straight run alongside the conveyor, labelling bars pivoted on and projecting laterally from the chain so as to lie over the conveyor in that run, a return run of the chain parallel to the straight run and connected to it by curved runs, means to apply a previously-gummed label to each labelling bar before it reaches the straight run, feed means to introduce each article to the straight run while the projecting labelling bars have a wide spacing imposed by their positions in the preceding curved run, propelling means movable into, along, and then away from the straight run to engage and propel each article, and then leave it still on the conveyor, means operable on a labelling bar at the start of the straight run to rock the bar about its pivot on the chain so as to urge the bar, and a label carried by it, to an article propellel by a succeeding propelling means, the projecting labelling bars assuming in the straight run a closer spacing than in the preceding curved run, and label-wiping means disposed along that straight run.

2. A labelling machine as in claim 1, wherein the rocking of each pivoted labelling bar is controlled by providing that a part of a preceding propelling means moves into contact with the bar in the preceding curved run and moves out of contact in the straight run.

3. A labelling machine for upright articles comprising a straight feed and delivery conveyor for a succession of articles, an endless chain with a straight run alongside the conveyor, labelling bars and propelling means projecting laterally from the chain so as to lie over the conveyor in that straight run, a return run of the chain parallel to the straight run and connected to it by curved runs, means to apply a previously-gummed label to each labelling bar before it reaches the straight run, the curved runs of the chain causing each projecting propelling means and the labelling bar preceding it to be separated for free entry of an article between them at one end of the straight run and likewise for free exit of a labelled article directly on to the same conveyor at the other end of the straight run, and the movement of the chain into that straight run effecting a closing of the labelling means and the propelling means for the former to apply a label to the article, and label-wiping means disposed along that straight run.

4. A labelling machine for upright articles comprising a straight feed and delivery conveyor for a succession of articles, an endless chain with a straight run alongside the feed conveyor, labelling bars and propelling means projecting laterally from the chain so as to lie over the conveyor in that straight run, the labelling bars being pivoted on the chain, a return run of the chain parallel to the straight run and connected to it by curved runs, means to apply a previously-gummed label to each labelling bar before it reaches the straight run, and label-wiping means disposed along the straight run, the curved runs of the chain causing each projecting propelling means and the labelling bar preceding it to be separated for free entry of an article between them at one end of the straight run and likewise for free exit of a labelled article directly on to the same conveyor at the other end of the straight run, and the movement of the chain into that straight run effecting a closing of the labelling means and the propelling means for the former to apply a label to the article, a part of a propelling means preceding a labelling bar being adapted to contact that labelling bar to advance that bar before entry into the straight run and then to move out of contact, a spring being provided to urge the bar towards a bottle propelled by the succeeding propelling means.

5. A labelling machine for upright articles comprising a straight feed and delivery conveyor for a succession of articles, an endless chain of links with a straight run alongside the feed conveyor, labelling bars and propelling means pivoted on and projecting laterally from alternate links of the chain so as to lie over the conveyor in that straight run, a return run of the chain parallel to the straight run and connected to it by curved runs, means to apply a previously-gummed label to each labelling bar before it reaches the straight run, label-wiping means disposed along the straight run, a rod connecting a labelling bar link to the propelling means pivoted on the succeeding link so as to retard the propelling means by the relative movement of the links in the curved run preceding the straight run, to increase the space between the bar and the propelling means for introduction between them of an article on the conveyor, additionally to the increased spacing imposed on the projecting bar and propelling means by the movement of the links in the preceding curved run, and to allow the propelling means to urge the article towards the labelling means in the straight run, and means also to urge that labelling bar about its pivot towards the article, the curved run of the chain succeeding the straight run also causing each projecting propelling means and the labelling bar preceding it to be separated for free exit of a labelled article at the delivery end of the straight run.

6. A labelling machine as in claim 5, wherein a propelling means preceding a labelling bar has means to contact that bar to advance it with respect to the propelling means succeeding that bar in the curved run preceding the straight run, and a spring is provided to urge the labelling bar towards the article admitted between it and the succeeding propelling means as the preceding propelling means ceases contact with the bar in the straight run.

7. A labelling machine for upright articles comprising a straight feed and delivery conveyor for a succession of articles, an endless chain with a straight run alongside the feed conveyor, labelling bars and propelling means projecting laterally from the chain so as to lie over the conveyor in that straight run, a return run of the chain paralled to the straight run and connected to it by curved runs, the curved runs of the chain causing each projecting propelling means and the labelling bar preceding it to be separated for free entry of an article between them at one end of the straight run and likewise for free exit of a labelled article directly on to the same conveyor at the other end of the straight run, and the movement of the chain into that straight run effecting a closing of the labelling means and the propelling means for the former to apply a label to the article, a suction transfer pusher mounted to oscillate with respect to a labelling bar in the return run of the chain to apply a previously gummed label to the bar as it oscillates towards the bar, and label-wiping means disposed along the straight run.

8. A labelling machine for upright articles comprising a straight feed and delivery conveyor for a succession of articles, an endless chain with a straight run alongside the feed conveyor, labelling bars and propelling means projecting laterally from the chain so as to lie over the conveyor in that straight run, a return run of the chain parallel to the straight run and connected to it by curved runs, the curved runs of the chain causing each projecting propelling means and the labelling bar preceding it to be separated for free entry of an article between them at one end of the straight run and likewise for free exit of a labelled article directly on to the same conveyor at the other end of the straight run, and the movement of the chain into that straight run effecting a closing of the labelling means and the propelling means for the former to apply a label to the article, a pick-up box with apertured sides forming a truncated pyramid, means to apply gum to the sides, means disposed above the box to apply labels to the gummed sides, an inclined axis for the pyramidal box such that each side is brought first below the said label-applying means and then to an upright position alongside the return run of the chain, a transfer pusher mounted to oscillate through an aperture in each upright side to apply a previously gummed label from that side to a labelling bar in the return run and to return to the inside of the box, and label-wiping means disposed along the straight run.

9. A labelling machine for upright articles comprising an endless chain with a straight labelling run, a parallel return run, and curved runs connecting the parallel runs, a pyramidal pick-up box alongside the return run, an inclined axis for the box such that each side may be rotated to an upright position alongside the return run, the sides having apertures that are also upright in that position, means for gumming the sides, means for applying labels to the gummed sides, a suction transfer pusher mounted to oscillate from inside the box, through an upright aperture, and to the return run, and back again, a straight conveyor for feeding upright articles alongside the straight run of the chain, propelling means mounted on and projecting laterally from the chain to propel articles along the straight run, suction labelling bars mounted on and projecting laterally from the chain in advance of each propelling means, both the bars and the propelling means being caused by the movement of the chain to have wider spacing as they follow the curved runs than when they follow the straight run, thus permitting free entry and exit of articles into and out of the straight run, the exit of the articles being direct on to the same conveyor, and the transfer pusher being positioned to supply each labelling bar with a previously gummed label as the bar is leaving the return run and has assumed an oblique position in the curved run preceding the straight run, and label-wiping means disposed along the straight run.

10. A labelling machine for upright articles, comprising a straight feed and delivery conveyor for the articles, an endless chain of alternate upper and lower links providing a labelling run alongside the conveyor and return run connected by curved runs, labelling bars carried by upper links and projecting outwardly from the chain, propelling arms carried by lower links and likewise projecting outwardly, means for applying to each labelling bar a previously gummed label before it reaches the straight run, vertical pivots for the bars and arms on their respective links, an arm inwardly of a bar pivot to be engaged by a preceding arm to advance the bar in the curved run preceding the straight run, a spring to oppose that advancing action, connected between the link for the bar and the link for the succeeding bar, and a rod connecting the link of each bar with the succeeding propelling arm to retard that arm in the same curved run while the links pass round that run, so that there is wide spacing between a labelling bar for the entry of an article between them at the feed end of the straight run, a close spacing along that run, and again a wide spacing for a labelled article to leave the delivery end of that run, together with label-wiping means disposed along that run.

References Cited in the file of this patent

UNITED STATES PATENTS

| | | |
|---|---|---|
| 2,568,904 | Weber et al. | Sept. 25, 1951 |
| 2,665,025 | Carter | Jan. 5, 1954 |
| 2,703,660 | Von Hofe et al. | Mar. 8, 1955 |
| 2,723,042 | Banks | Nov. 8, 1955 |
| 2,725,156 | Manas | Nov. 29, 1955 |
| 2,773,617 | Weiss | Dec. 11, 1956 |